United States Patent
Bird

(10) Patent No.: US 11,533,857 B1
(45) Date of Patent: Dec. 27, 2022

(54) TREATMENT FLUID INFUSION SYSTEM AND APPARATUS FOR TREES AND METHOD OF USING SAME

(71) Applicant: Jeffrey J Bird, Stillwater, MN (US)

(72) Inventor: Jeffrey J Bird, Stillwater, MN (US)

( * ) Notice: Subject to any disclaimer, the term of this patent is extended or adjusted under 35 U.S.C. 154(b) by 807 days.

(21) Appl. No.: 16/392,141

(22) Filed: Apr. 23, 2019

Related U.S. Application Data

(63) Continuation of application No. 15/043,474, filed on Feb. 12, 2016, now abandoned.

(51) Int. Cl.
*A01G 7/06* (2006.01)

(52) U.S. Cl.
CPC ...................................... *A01G 7/06* (2013.01)

(58) Field of Classification Search
CPC .................................. A01G 23/10; A01G 23/14
USPC ............................................................ 47/57.5
See application file for complete search history.

(56) References Cited

U.S. PATENT DOCUMENTS

| | | | |
|---|---|---|---|
| 1,718,195 A | 6/1929 | Rankin | |
| 2,934,859 A | 5/1960 | Little | |
| 3,254,449 A * | 6/1966 | Mauget | A01G 7/06 604/238 |
| 3,286,401 A * | 11/1966 | Mauget | A01G 7/06 222/386 |
| 3,295,254 A | 1/1967 | Schoonman | |
| 4,112,617 A * | 9/1978 | Purviance | A01G 7/06 401/190 |
| 4,365,440 A * | 12/1982 | Lenardson | A01G 7/06 128/200.22 |
| 4,908,983 A | 3/1990 | Mazur et al. | |
| 5,031,357 A * | 7/1991 | Macbeth | A01G 7/06 47/57.5 |
| 5,355,619 A | 10/1994 | West et al. | |
| 5,355,620 A | 10/1994 | Newbanks | |
| 5,596,837 A | 1/1997 | Duff | |

(Continued)

FOREIGN PATENT DOCUMENTS

| | | | |
|---|---|---|---|
| CH | 316637 B1 | 10/1953 | |
| KR | 20100007512 | * 7/2010 | |
| WO | WO-2019023755 A1 | * 2/2019 | A01M 21/043 |

OTHER PUBLICATIONS

Kuhns, Michael, "Getting Chemicals Into Trees Without Spraying", Utah State University Cooperative Extension, Publication NR/FF/020, no date but published before application was filed.

(Continued)

*Primary Examiner* — Magdalena Topolski
(74) *Attorney, Agent, or Firm* — Berggren Law Offices, LLC

(57) ABSTRACT

A system for administering a fluid to a tree. The fluid can be water, coloring agents, insecticides, fungicides, nutrients, plant growth regulators and herbicides. The system also includes a pressurizable container containing the fluid and a low pressure gas. The pressurizable container is attached to a manifold. Additionally, an infusion nozzle is attached to the manifold and configured to provide attachment of the system to a tree for an extended period of time ranging from weeks to months. The system also can, optionally, include an infusion control valve configured to regulate the flow of fluid from the container, through the manifold, through the infusion nozzle and into the tree. The infusion nozzle has threads that provide direct attachment to the tree.

8 Claims, 5 Drawing Sheets

(56) References Cited

U.S. PATENT DOCUMENTS

| | | | |
|---|---|---|---|
| 5,956,894 A | 9/1999 | Eldridge | |
| 6,216,388 B1* | 4/2001 | Miller | A01G 7/06 |
| | | | 424/405 |
| 8,726,567 B1 | 5/2014 | Pishdadian et al. | |
| 10,681,874 B1* | 6/2020 | Scarlata | A01G 7/06 |
| 2002/0046486 A1 | 4/2002 | Wild et al. | |
| 2004/0079169 A1 | 4/2004 | Wild et al. | |
| 2012/0126024 A1* | 5/2012 | Boyd | A01M 1/2044 |
| | | | 239/6 |
| 2013/0244135 A1* | 9/2013 | Yamane | H01M 8/1023 |
| | | | 429/492 |
| 2014/0345194 A1 | 11/2014 | Vue et al. | |
| 2017/0071136 A1 | 3/2017 | Andrews | |

OTHER PUBLICATIONS

Jones, Thomas W and Gregory, Garold F., "An Apparatus for Pressure Injection of Solutions Into Trees", USDA Forest Service Research Paper NE-233, 1971 (Dec. 27, 1971).

* cited by examiner

TREATMENT FLUID INFUSION SYSTEM AND APPARATUS FOR TREES AND METHOD OF USING SAME

FIELD

This application relates to a system, apparatus, and method for infusing trees with treatment fluids intended, for example, for the treatment of diseases, application of nutrients or growth regulators, or herbicides.

BACKGROUND

Treatment fluids such as, for example, insecticides, fungicides, nutrients, plant growth regulators, coloring agents, and herbicides can be applied to trees for many reasons. Insecticides can be applied to repel kill damaging insects. Fungicides can treat or prevent fungal diseases. Nutrients and plant growth regulators such as hormones or hormone-like substances can affect growth and growth rate. Herbicides can be applied to tree to kill the trees or prevent sprouting after tree removal. And sometimes it is beneficial to hydrate trees by applying water to the tree particularly during a drought.

Treatment fluids can be applied to trees by several methods. Topical spraying is the most typical way to apply these treatment fluids. Spraying is fast, can use readily available equipment if the viscosity of the treatment fluid is compatible with the equipment and is well understood in the art of plant horticulture. However, spraying can waste the treatment fluid by run off, evaporation, or because it may not be applied precisely to where it is needed in the tree. The treatment fluid can be more effective when placed inside the tree and this is challenging with spraying.

Trees can also be injected with treatment fluids. Treatment fluids are typically injected into the stem or trunk of the tress through various types of holes and devices using high pressure. A drawback of using pressure is the possibility of a bubble or embolism forming under the bark at high pressure. Bark can separate in the cambial area as treatment fluids are injected. This can create a reservoir of treatment fluid that can be slowly taken up over time, but the entire bubbled area can be considered as a wound. Cells can be split apart and can be killed when a bubble is created. Additionally, high pressure injection can require the use of a rubber septum or seal at the point of injection to minimize leakage. High pressure systems are complicated and expensive and generally not available to non-experts.

The provided system and method can treat trees and save the work and expense of cutting trees down. Additionally, they can reduce the spread of disease to other trees thus saving loss to property value. The provided system and apparatus are inexpensive and can be reused. By using low pressure over a long period of time less damage is done to the trees allowing more of them to recover.

SUMMARY

There is a need for a system and method of infusing trees with treatment fluids at low pressure. There is also a need for a system and method of infusing tress with treatment fluids that does minimal damage to tree cells, is simple to operate, inexpensive and can be applied by a non-expert consumer.

In one aspect, a system is provided that includes a fluid to be administered to the tree. The fluid can be water, coloring agents, insecticides, fungicides, nutrients, plant growth regulators and herbicides. The system also includes a pressurizable container containing the fluid and a low pressure gas. The pressurizable container is attached to a manifold. Additionally, an infusion nozzle is attached to the manifold and configured to provide attachment of the system to a tree for an extended period of time ranging from weeks to months. The provided system also can, optionally, include an infusion control valve configured to regulate the flow of fluid from the container, through the manifold, through the infusion nozzle and into the tree. The infusion nozzle can have threads that provide direct attachment to the tree.

In another aspect, a method of administering a fluid to a tree is provided that includes drilling a hole through the bark of the tree and attaching a system for administering a fluid to the hole in the tree. The system includes the fluid to be administered to the tree, a pressurizable container containing the fluid and a low pressure gas. The pressurizable container is attached to a manifold. Additionally, an infusion nozzle is attached to the manifold and configured to provide attachment of the system to a tree for an extended period of time. The manifold can also be in communication with an infusion control valve that is configured to regulate the flow of fluid from the container, through the manifold, through the infusion nozzle and into the tree. The method includes leaving the system in place until a substantial amount of fluid has infused the tree. The attaching the system includes directly threading the infusion nozzle into the tree. Furthermore, the system is left in place long enough for substantially all of the fluid to infuse into the tree.

In yet another aspect, an apparatus for treating trees is provided that includes a pressurizable container. The pressurizable container includes treatment fluid and a low pressure gas. The pressurizable container can be attached to a manifold along with an infusion nozzle. The infusion nozzle can be configured to provide attachment of the system to a tree for an extended period of time. The infusion nozzle can have threads that are configured to provide direct attachment of the system to the tree.

In this disclosure:

the term "treatment fluid" and "fluid" are used interchangeably herein;

the term "tree" refers to all woody parts of a tree such as trunks, branches, twigs and woody roots of tree stems;

the term "low pressure" refers to pressures of less than about 690 kPa (100 pounds per square inch); and the term "high pressure" refers to pressures above about 690 kPa.

The details of one or more embodiments are set forth in the accompanying drawings and description below. Other features, objects, and advantages will be apparent from the description and drawings, and from the claims.

DETAILED DESCRIPTION

In the following description it is to be understood that other embodiments are contemplated and may be made without departing from the scope or spirit of the present invention. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Tree horticulture can require the treatment of trees with treatment fluids such as insecticides, fungicides, nutrients, plant growth regulators, coloring agents, herbicides, or even water. There are many methods known to get such treatment fluids into trees. These methods include spraying, trunk implanting, trunk injecting, soil injecting/drenching, and trunk basal spraying.

Figure 1:
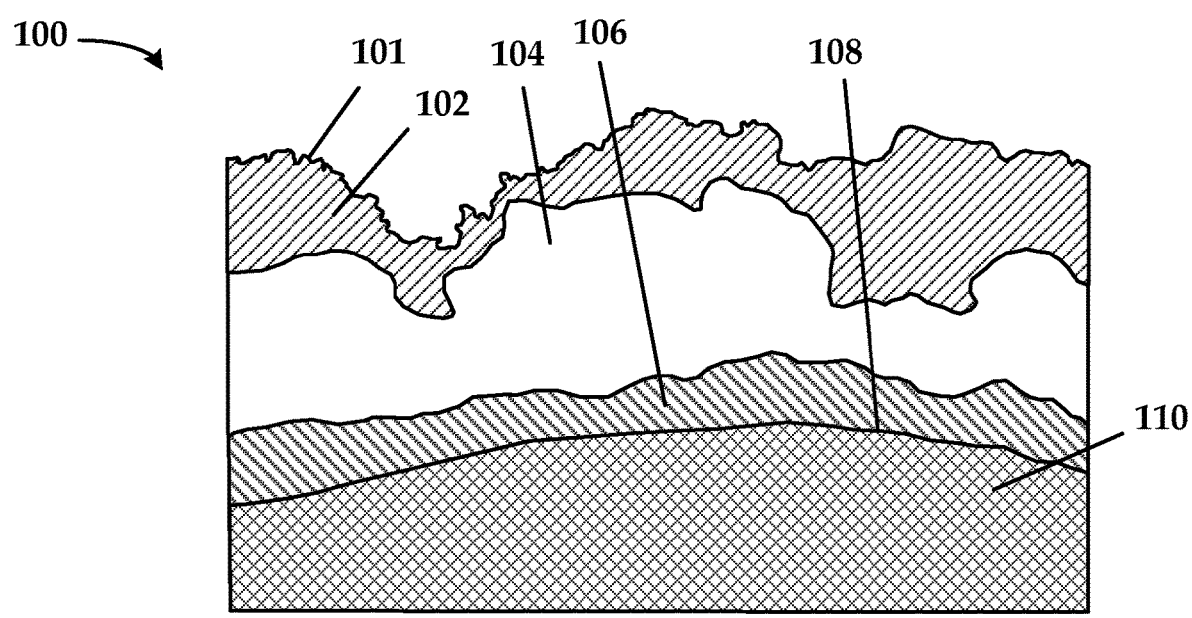
FIG. 1 is a cross section schematic drawing of a trunk edge that displays vascular system issues.

FIG. 1 is a drawing of a cross section schematic tree trunk 100 displaying important features of the vascular system of a tree. Tree trunk 100 shows outer edge (or bark) 101 of tree trunk 100. Just inside of outer edge 101 is phellem 102, otherwise known as cork or outer bark of the tree. Phellem 102 is mostly dead corky tissue or cork cambium. Inside phellem 102 is phellogen 104 makes cork to thicken the outer bark of the tree. Phloem 106 is tissue that conducts food through the tree from where it is stored or made to where it is to be used in the tree. Vascular cambium 108 contains cells that divide rapidly to make new phloem 106 and xylem 110. Xylem 110 includes an outer layer (not shown) called that sapwood that conducts mostly water and minerals from the roots to the canopy of the tree. The inner layer of xylem 110 (also not shown) is called the heartwood that is aged sapwood that has died and has lost its ability to conduct water but still functions to add strength. Phloem 106 and xylem 110 consist mostly of vertical tubes of various sizes, but also have some bundles of tubes called rays that are oriented radially—extending from the center portion of the tree outward through the sapwood and cambium to the phloem. The largest rays extend from the deepest largest bark fissures and have relatively little outer bark covering the outer ends of those rays. The rays can be important for treatment fluid uptake.

A system is disclosed for administering a treatment fluid to a tree. Fluids that can be administered to a tree can include, for example, water, coloring agents, insecticides, fungicides, nutrients, plant growth regulators, and herbicides. Water can be administered to trees particularly during drought periods to rehydrate dehydrated trees. Insecticides can be synthetic or organic. Synthetic insecticides can include any chemical compounds or formulations that are designed to be toxic to insects that are parasitic to trees or plants. These chemical compounds can include pyrethroids, veratrum alkaloids, sodium channel blocking insecticides, ryanoids, acetylcholine mimics, organophosphorus, carbamate insecticides, insecticides affecting octopamine receptors, compounds affecting chloride channels, avermectins, and chemicals that affect energy metabolism. Additionally, insect growth regulators can be used. In some embodiments, organic insecticides can be utilized. Other fluids that can be infused into a tree include antibiotics, abamectin, azadirachtin, bidrin, imidacloprid, metasystox-R, and debacarb. Not all of the above-listed insecticides are suitable for infusion into trees. A person of ordinary skill in the art of pest treatment will know which insecticides are effective when infused into a tree.

Treatment fluids for trees can include fungicides such as and phosphorous acid and its derivatives, tebuconazole, copper compounds, and myclobutanil, to name a few. Nutrient treatment fluids include fertilizers that are made up of macronutrients such as nitrogen, phosphorus and potassium and micronutrients such as, for example, iron, magnesium and manganese. Plant growth regulators include chemicals that regulate the growth of trees. Typical plant growth regulators include paclobutrazol, root growth hormones, and root stimulators. Herbicides can be applied to kill an unwanted, invasive, or diseased tree or to kill unwanted shoots. Typical tree herbicides include triclopyr amines, triclopyr esters, glycophosphates, and imazapyr. It is contemplated that other fluids of importance to tree horticulture may also be administered with the systems and methods disclosed herein.

Figure 2:
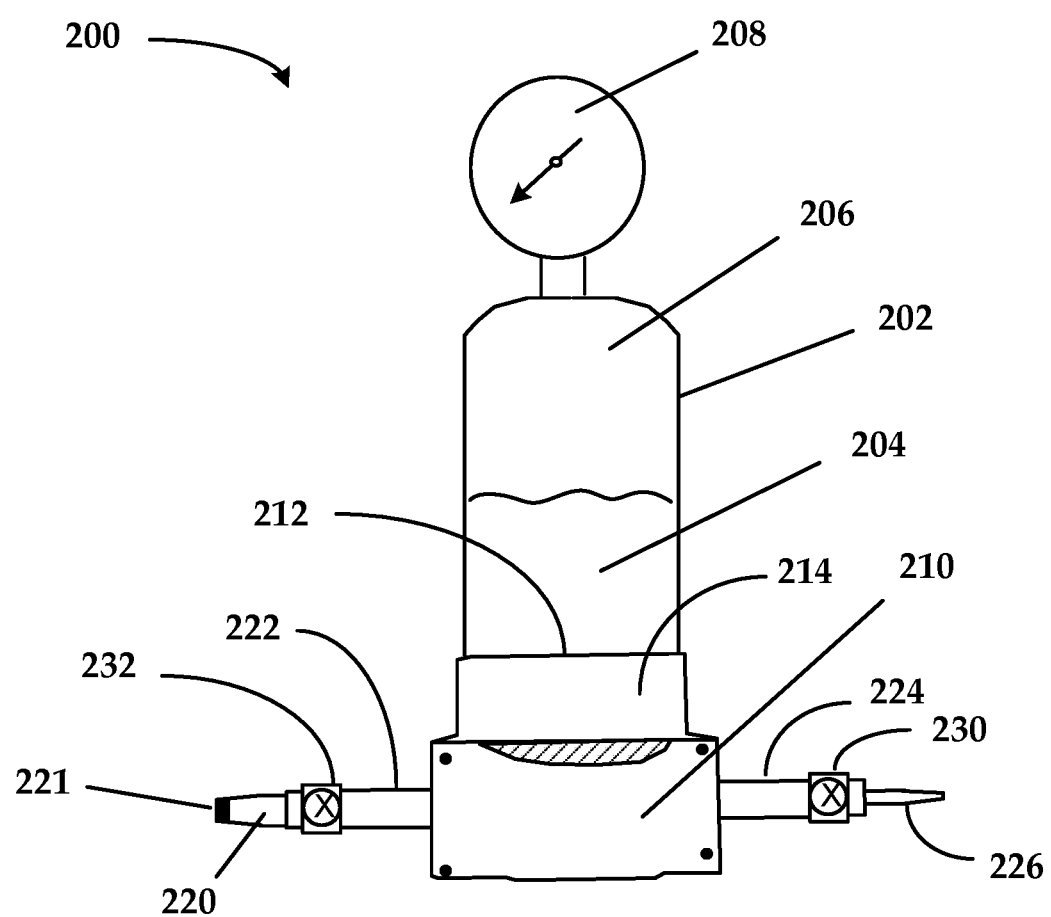
FIG. 2 is a schematic side-view drawing of an embodiment of the provided system for administering a treatment fluid to a tree.
Figure 3:
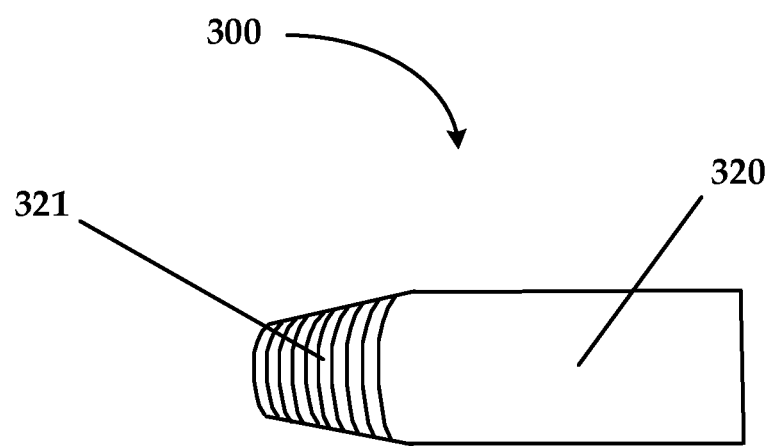
FIG. 3 is a schematic side view drawing of an embodiment of an infusion nozzle of the provided system for administering a treatment fluid to a tree.

An embodiment of the disclosed system for administering a treatment fluid to a tree is illustrated in FIGS. 2-3. FIG. 2 is a schematic side-view drawing of an embodiment of the provided system for administering a treatment fluid to a tree. System 200 includes pressurizable container 202. Pressurizable container 202 comprises treatment fluid 204 and low pressure gas 206. Optional pressure gauge 208 measures the pressure of low pressure gas 206. Pressurizable container 202 can be made of glass, plastic, metal, or any other material that is designed to withstand low pressure gas 206. In many embodiments, pressurizable container 202 can be transparent to allow visual observation of the rate of fluid uptake by the tree. Treatment fluid 204 is described above. Typically, pressurizable container 202 is filled to about half of its total capacity of less. In some embodiments, pressurizable container 202 has a volume of about 100 ml. In other embodiments, the volume of pressurizable container 202 can have a capacity volume of about 250 ml, 500 ml, 1 l, or even 2 l. The only restriction is that the system needs to be self-supporting when attached to a tree. Low pressure gas 206 can be any gas that is inserted with respect to reaction with treatment fluid 204 and to the tree to be treated. Typical low pressure gases include air, nitrogen, argon, carbon dioxide, propane, and butane. In this application, low pressure refers to pressures greater than ambient pressure and less than about 690 kPa (100 pounds per square inch); less than about 414 kPa (60 pounds per square inch), less than about 276 kPa (40 pounds per square inch), from about 35 kPa (5 pounds per square inch) to about 690 kPa (100 pounds per square inch), from about 69 kPa (10 pounds per square inch) to about 690 kPa (100 pounds per square inch), from about 138 kPa (20 pounds per square inch) to about 414 kPa (60 pounds per square inch), or from about 276 kPa (40 pounds per square inch) to about 414 kPa (60 pounds per square inch).

Pressurizable container 202 is capable of withstanding the above listed pressures. Pressurizable container 202 can be attached and sealed to manifold 210 to form a pressurized container of fluid and low pressure gas. Typically, pressurizable container 202 can be attached to manifold top 214 of manifold 210 to form the pressurized container. In some embodiments, pressurizable container 202 can have male screw threads at pressurizable container bottom 212 (threads not seen but inside of manifold top 214). Manifold top 214 can have female threads that are configured to engage male screw threads of pressurizable container bottom 212. If necessary, a sealing gasket material can be utilized to prevent leaks. Other sealing connectors are also within the scope of this disclosure. Connectors such as snap connectors, connectors with flanges and clamps, or any other way of connecting pressurizable container 202 to manifold 210 so gas 206 can force fluid 204 into manifold 210 without loss of fluid or pressure is contemplated. Infusion nozzle 220 (shown in more detail in FIG. 3) is attached to manifold 210 through nipple 222 and is in fluid communication with fluid 204 through manifold 210. Optional infusion control valve 232 can provide control over fluid flow. Infusion control valve 232 can be configured to regulate the flow of fluid from container 202 through manifold 210, through infusion nozzle 220, and into the tree. Infusion nozzle 220 has tapered threads 221 at its open end. Infusion nozzle 220 is configured to provide attachment of the disclosed system to a tree for an extended period of time. Infusion nozzle 220 has threads 221 that provide direct attachment of the system to a tree. By direct attachment it is meant that infusion nozzle is screwed into the tree and supports the weight of the whole system without the need for supports such as straps, brackets, or chains, and without the need for hoses.

Pressurizable container 202 includes a refillable compartment (shown in FIG. 2 as filled with fluid 204 and low pressure gas 202) and can be reversibly attached and sealed to the manifold as described above. System 200 also has gas attachment nozzle 226 in communication with manifold 210 through optional check valve 230 via nipple 224. Pressurized gas can be charged into system 200 through gas attachment nozzle 226. In some embodiments, gas attachment nozzle 226 has quick connect adapters. In other embodiments, it can be attached to gas hoses in order to charge low pressure gas into the system.

FIG. 3 is a schematic side view drawing of an embodiment of an infusion nozzle of the provided system for administering a treatment fluid to a tree. Infusion nozzle 300 has body 320 that includes threaded tapered end 321. Infusion nozzle 300 has an internal channel capable of delivering fluid through threaded tapered end 321 and into the tree. Typically, infusion nozzle 300, when attached to the disclosed system, can thread into the tree to a depth of at least about 1.25 cm, at least about 2.5 cm, at least about 3.75 cm, or even at least about 6 cm. Threaded tapered end 321 only needs to be threaded for about 1.25 cm, for about 2.5 cm, for about 3.75 cm, or even for about 6 cm of the length of body 320. Prior to attaching the disclosed system to the tree, a small diameter bore hole is drilled about 2.25 cm, about 3.5 cm about 4.75 cm, or even about 7 cm, or more into the trunk, stem, or root of the tree to allow for an empty chamber at the end of the inserted tapered end 321 for fluid to reside for a time. The hole has to be of a smaller diameter than the treaded tapered end of the infusion nozzle. Then the injection nozzle of the system is threaded directly into the tree with the threaded tapered end of the infusion nozzle engaging into the hole in the tree. The system is screwed into the tree far enough so that it is directly attached to the tree and so that leaks are minimized.

Figure 4:
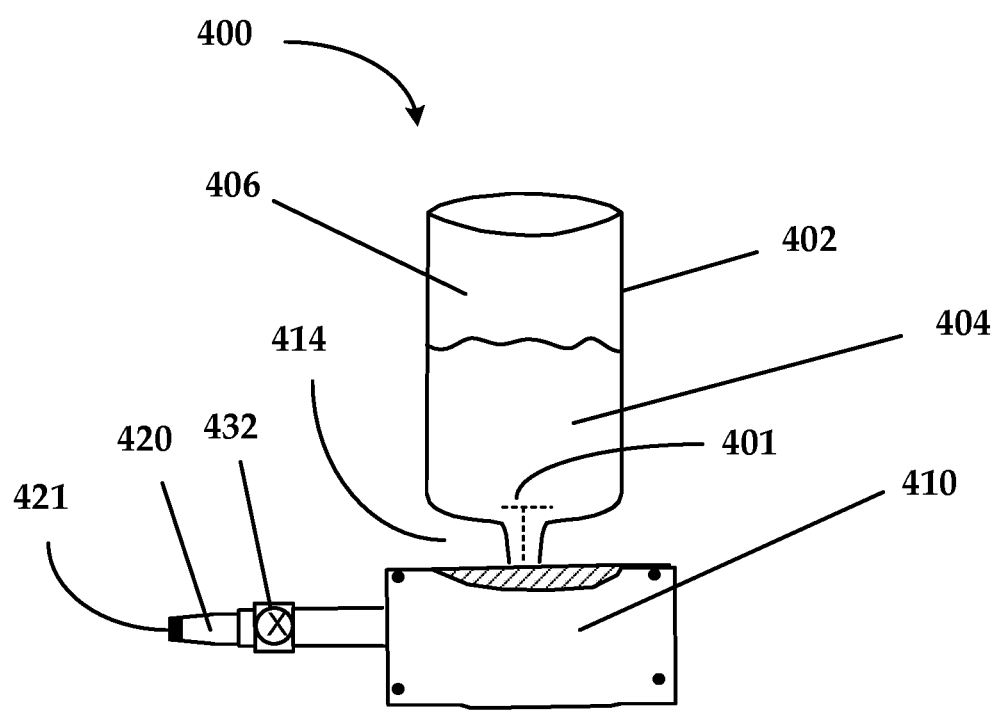
FIG. 4 is a schematic side-view drawing of another embodiment of the provided system for administering a treatment fluid to a tree.

FIG. 4 is a schematic side-view drawing of another embodiment of provided system 400 for administering a treatment fluid to a tree. Prefilled pressurized container 402 is equipped with safety valve 401 that seals fluid 404 and low-pressure gas 406 in prefilled pressurized container 402 until it is engaged into top portion 414 of manifold 410 which causes check valve 401 to open filling manifold 420 with fluid 404. Safety valve 401 can be a spring-loaded valve that opens when canister 402 is fully engaged in top portion 414 of manifold 410. It can reseal itself if canister 402 is removed from the manifold. Fluid 404 passes through manifold 410, optionally, through infusion control valve 432 and then through infusion nozzle 420. Infusion nozzle 410 has threaded tapered end 421 that is capable of being attached to a tree.

In another aspect, a method of administering a treatment fluid to a tree is disclosed that includes drilling a hole at least through the bark of a tree and then attaching a system for administering a treatment fluid to the hole in the tree. The system includes the treatment fluid to be administered to the tree. Possible treatment fluids are discussed above. The system also includes a pressurizable container that includes the treatment fluid and a low pressure gas. The pressurizable container can either be a refillable container that can be threaded to the top of the manifold with a tight seal or can be a pre-filled pressurized canister that has a safety valve and is configured to be reversibly attached and sealed to the manifold. The system is described above.

Figure 5:
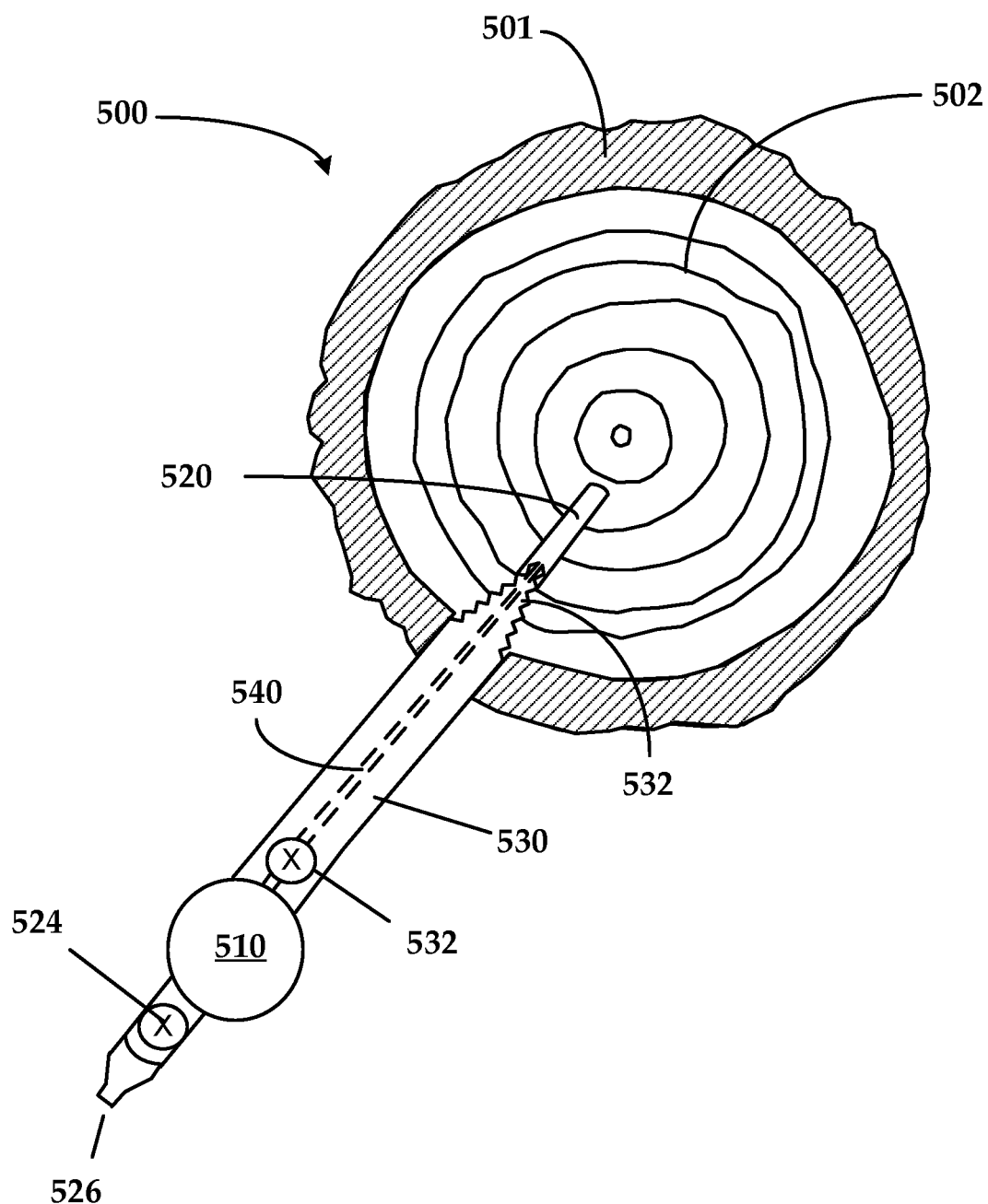
FIG. 5 is a schematic drawing of a cross-section of a tree with an embodiment of the provided system attached to a hole that has been drilled in the tree.

FIG. 5 is a schematic drawing of a cross-section of a tree with an embodiment of the provided system attached to a tree. Tree cross-section 500 shows outer bark layer of tree 501 and inner xylem of tree 502. Infusion nozzle 530 is attached to infusion system 510 (just shown in this drawing as a circle). Infusion nozzle 530 is inserted into hole 520 drilled through bark 501 and into xylem 502 of tree. Infusion nozzle has tapered threaded end 530 that is screwed partly into hole of the tree so that it can deliver treatment fluids into tree through internal channel 540. Screw threads 532 form a mechanical anchor to hold system 510 into place. Infusion nozzle 530 is attached to system 510 through infusion control valve 532. System 510 can be charged with low pressure gas through gas attachment nozzle 526 and check valve 524.

The disclosed system can be attached to the tree by directly threading the infusion nozzle into the hole through the bark of the tree. In order to have mechanical stability it is important that the diameter of the hole drilled into the tree is slightly less than the outer diameter of the infusion nozzle threads. It is also important that the hole is drilled deeper into the tree than the depth of the infusion nozzle when it is in place. This creates extra surface area for treatment fluid to be absorbed by the woody material in the xylem of the tree. A bubble of treated wood can form inside of the tree allowing the treatment fluid to migrate to the cambium layer and thereby systemically to the whole tree.

The disclosed method further includes leaving the system in place for an extended period until a substantial amount of treatment fluid has infused the tree. The extended period can be greater than or equal to one week, greater than or equal to one month, or even longer. A substantial amount of treatment fluid can be the amount per tree volume that is suggested by the manufacturer of the fluid or an effective dose. In some embodiments, the volume of treatment fluid that is infused into the tree can be monitored over time through the pressurizable container if that container has transparent walls.

Disclosed is a system and method of administering treatment fluids to a tree at low pressure. The disclosed system and method of infusing tress with treatment fluids does minimal damage to tree cells, is simple to operate, inexpensive and can be applied by a non-expert consumer.

Objects and advantages of this invention are further illustrated by the following examples, but the particular materials and amounts thereof recited in these examples, as well as other conditions and details, should not be construed to unduly limit this invention.

EXAMPLES

Example 1

A whole house clear water filter container was disassembled by removing the container. The filter had a capacity of about 1 liter. A 5 cm long×0.64 cm diameter pipe nipple with tapered threads was secured into the output side of the manifold of the filter. Compatible sized ball valves were installed into both the input and the output sides of the manifold. On the input side of the manifold a compressed air quick connect fitting was installed so that the unit could be charged with air.

Tree insecticide ("TREE AND SHRUB PROTECT AND FEED", available from Bayer) was mixed with 4 parts of distilled water. It was poured into the container until the container was filled halfway. The container was then reassembled to the manifold by screwing the container into the base manifold. The contents were pressurized with about 40 pounds per square inch (psi) (276 kPa) using the air inlet quick connect or a car tire valve. The device was then connected to a tree with a diameter of 30 cm by drilling a hole slightly smaller than the output pipe and then screwing the device into the tree. A hold was drilled into the trunk of the each of the trees that was 10 cm to 15 cm deep. The device was then screwed into the hole about 2.5 cm or enough to mechanically support the device. The extra length of the hole provided surface area for the treatment fluid to be absorbed into the woody material of the tree. The device was manually tested by pulling on it to see if the connection to the tree was rigid enough. Next the output valve was opened, and fluid was allowed to soak into the tree for several weeks. The rate of absorption of the fluid was found to be dependent on the size of the tree, the time of year, and the species of tree.

Five pine trees were treated using this method. All were partially brown and three of the trees were almost totally brown when treated. After treatment for one month, the trees began to green up and survived. Twenty more infected trees were treated were treated with eighteen of the trees surviving and only two trees dying. Finally, two elm trees (one 25 cm in diameter and one 45 cm in diameter) that were very sick with wilted shriveled leaves were treated. These trees were treated for two months. After treatment the two elms trees had small leaves, but they were observed to be firm and healthy. The trees were all treated in the spring and early summer in Minnesota. Only about 10% of the trees that were treated did not survive.

Example 2

A fluid is premixed and pressurized in an aerosol can that screwed into a manifold. A small pressurized cylinder like those used for propane is used and treatment fluid is added to the canister until it is half full. A propellant such as carbon dioxide is added to the cylinder. The cylinder is attached to a manifold by screwing it into the manifold. The cylinder has a spring-loaded safety valve that only opens when the cylinder is seated properly and sealed to the manifold. The manifold that includes an infusion nozzle with a threaded tapered end is screwed into the tree and left there for an extended period of time.

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows. All references cited within this document are hereby incorporated by reference in their entirety.

What is claimed is:

1. A method of administering a treatment fluid to a tree comprising:
    drilling a hole into a sapwood or outer xylem layer of the tree;
    providing a system for administering a treatment fluid to a tree comprising:
        the treatment fluid to be administered to the tree;
        a pressurizable container comprising the treatment fluid and a low-pressure gas at a pressure greater than ambient pressure and less than about 690 kPa (100 pounds per square inch), the pressurizable container attached to a manifold; and
        an infusion nozzle attached to the manifold, the infusion nozzle comprising screw threads at a tapered end configured to provide direct attachment of the system to a tree for an extended period of time greater than or equal to one week and an internal channel with an opening through the end of the tapered end to permit treatment fluid to continuously pass into a predrilled empty chamber in the tree under pressure above that of gravity; and
        a mechanical anchor consisting of the screw threads of the infusion nozzle that provides direct attachment of the system to the tree;
    attaching the system for administering a treatment fluid to the hole in the tree before the sapwood or outer xylem layer while leaving an empty chamber with a length of at least 1.0 cm in front of an opening at the end of a tapered end of the infusion nozzle of system;
    permit the infusion nozzle to allow treatment fluid under low pressure to pass continually into the empty chamber and infuse into the tree;
    leaving the system in place for the extended period of time until a substantial amount of treatment fluid has infused the tree.

2. A method according to claim 1, wherein the system further comprises an infusion control valve configured to regulate the flow of fluid from the pressurizable container, through the manifold, through the infusion nozzle and into the tree.

3. A method according to claim 1, wherein the system is left in place for a time period of greater than or equal to one month.

4. A method according to claim 1, wherein the treatment fluid is selected from insecticides, fungicides, nutrients, plant growth regulators, coloring agents, herbicides, and mixtures with water.

5. A method according to claim 1, wherein the pressurizable container comprises a pre-filled pressurized canister that has a safety valve and is configured to be reversibly attached and sealed to the manifold.

6. A method according to claim 1, wherein the pressurizable container comprises a refillable compartment that is configured to be reversibly attached and sealed to the manifold.

7. A method according to claim 1, wherein the low-pressure gas is at a pressure of from about 138 kPa (20 pounds per square inch) to about 414 kPa (60 pounds per square inch).

8. A method according to claim 1, wherein the low-pressure gas is at a pressure of from about 276 kPa (40 pounds per square inch) to about 414 kPa (60 pounds per square inch).

\* \* \* \* \*